Patented Nov. 5, 1935

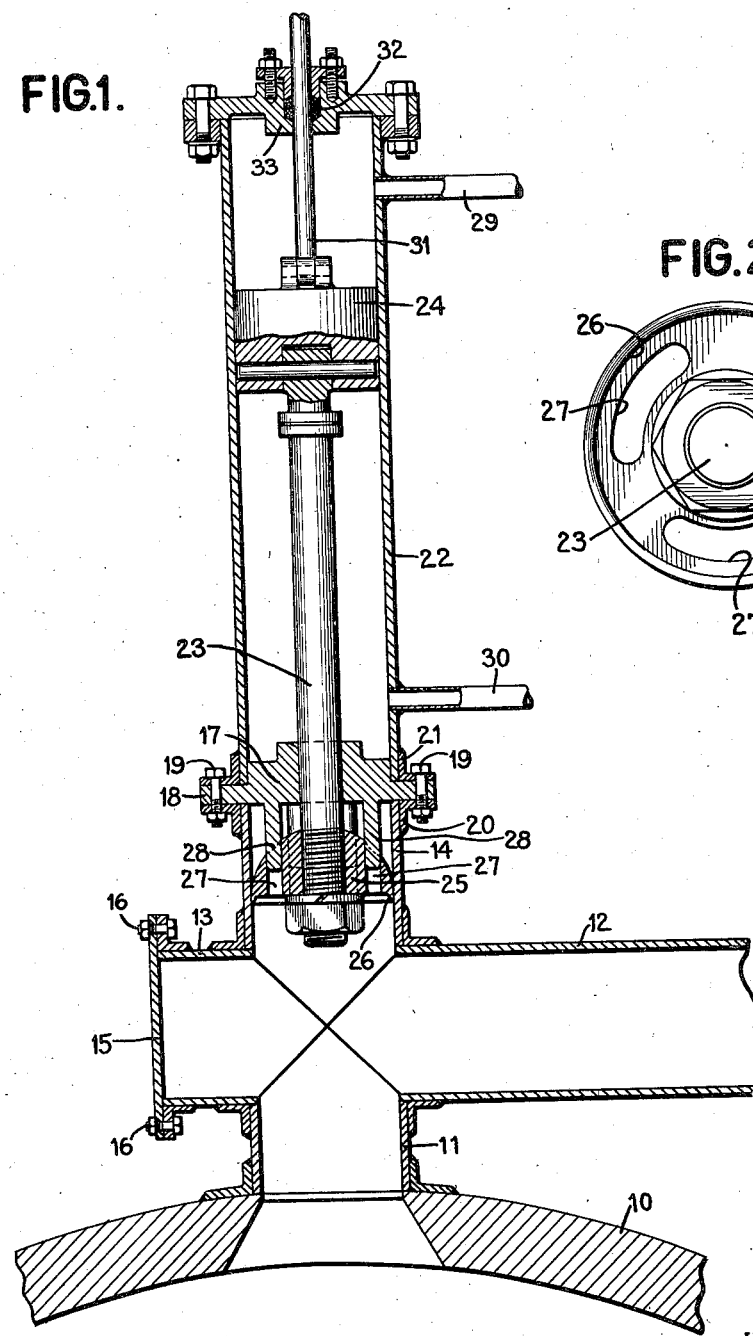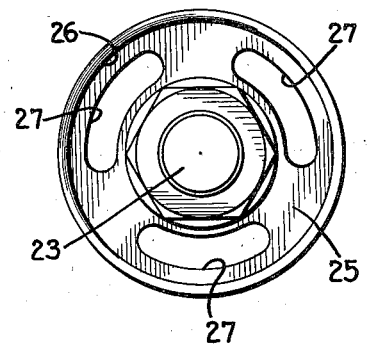

2,020,241

UNITED STATES PATENT OFFICE 2,020,241

APPARATUS EMPLOYED IN THE TREATMENT OF HYDROCARBON OILS

Howard Dimmig, New York, N. Y., assignor to Gasoline Products Company, Inc., Newark, N. J., a corporation of Delaware Application April 19, 1934, Serial No. 721,288

3 Claims. (Cl. 196—122)

This invention relates to an apparatus adapted for removing accumulated solid deposits from the mouth of a conduit leading to a reaction chamber.

Although the invention has other applications, it is particularly adapted for removing solid reaction products such as coke from the vapor outlet of a reaction chamber adapted to contain hydrocarbons undergoing conversion treatment. The invention may also be employed for removing solid deposits from the liquid outlet of the reaction chamber.

Trouble has been experienced in maintaining the vapor outlet of a reaction chamber employed in the treatment of hydrocarbon oils clear of solid deposits which tend to build up around the outlet and which cause an obstruction to the passage of vapors through the outlet. It has heretofore been proposed to mount a plunger in the vapor outlet conduit of a reaction chamber, which may be periodically operated to dislodge these solid reaction products. However, due to the construction of the plunger and the operating mechanism employed for reciprocating it, the plunger would sometimes jam or lodge in the vapor outlet and thereby cause serious interference with the oil treating operation. Moreover, unless immediate steps were taken to relieve the pressure in the reaction chamber when the plunger became jammed, there was always the possibility of destructive pressures being built up within the chamber.

Among the primary objects of the present invention are to provide an apparatus of the character referred to which will not be liable to jam or lodge in the outlet, which will more effectively remove the accumulated deposits, and which will not interfere with the oil treating operation.

With these and other objects in view the invention will be best understood by referring to the accompanying drawing in which:

Figure 1 is a longitudinal section of a device made in accordance with my invention and showing a part of a reaction chamber, and Figure 2 is an end view of the plunger head.

In the drawing, the reference character 10 designates a section of a reaction chamber of the character hereinbefore mentioned. The wall of the reaction chamber is provided with an opening leading to a conduit 11 which is secured to the reaction chamber in any suitable manner, and through which the vapor reaction products may be withdrawn from the chamber. The conduit 11 is connected to three branch conduits 12, 13, and 14, leading therefrom. The branch 12 constitutes the line for transferring the fluid reaction products from the chamber to other apparatus (not shown) wherein the fluid products are subjected to further treatment. The branch 13 directly opposite the conduit 12 is provided with a removable closure plate 15, secured in position to provide a fluid-tight seal by bolts 16, which may be removed for cleaning and inspecting the vapor conduit.

The branch conduit 14, directly opposite the outlet conduit 11, is provided with a bearing plate 17, having a circumferential flange 18, secured by bolts 19, between corresponding outwardly extending flanges 20 and 21 secured to the branch conduit 14 and the cylinder 22, respectively. The bearing plate 17 is provided with a central opening through which extends the piston rod 23. The piston rod 23 connects the piston 24, located in the cylinder 22, with the plunger head 25, located in the branch conduit 14.

In accordance with the present invention the plunger head 25 is hemispherical in form and provided with a downwardly extending peripheral cutting edge 26. The head 25 is further provided with passages 27 through which vapors or other fluids may pass to the outlet conduit when the plunger is at the bottom of its stroke. If desired the bearing plate 17 may be provided with downwardly projecting pins 28, adapted to project through the passages 27 when the plunger is at the top of its stroke so as to clear the passages of any solid deposits.

The opposite ends of the cylinder 22 have suitable port openings leading to pipes 29 and 30 which connect the cylinder with a source of fluid under pressure and suitable valves (not shown) whereby fluid under pressure may be alternately introduced and withdrawn from opposite ends of the cylinder to reciprocate the piston.

The piston 24 has a guide rod 31 secured thereto and projecting through a stuffing box 32 in the piston head 33. The rod 31 aids in maintaining the piston in proper alignment with respect to the cylinder and also affords a visual means for determining the position of the plunger within the vapor outlet.

By shaping the plunger head in the form of a hemisphere there is a minimum bearing surface between the head and the conduit wall so that the plunger may more readily align itself with the conduit and will consequently have less tendency to become jammed or lodged in the vapor outlet in the event the conduit or the piston rod 23 should become warped or twisted.

It is ordinarily desirable to allow a substantial amount of solid products to accumulate adjacent the vapor outlet before operating the plunger so that the plunger will cause the entire mass of accumulated deposits to dislodge from the chamber. If the plunger is operated too frequently it tends to drill a hole through the solid reaction products but permits the reaction products to build inwardly of the chamber until they extend beyond the reach of the plunger.

While the preferred embodiment of the invention has been described for purposes of illustration, it is understood that the invention embraces such other modifications and variations as come within the scope and spirit thereof. It is also understood that it is not the intention of the applicant to limit the invention except as necessary to distinguish over the prior art.

I claim:

1. An apparatus for removing solid deposits from the mouth of a conduit leading to a reaction chamber comprising a hemispherically shaped plunger head having passages therethrough, means for movably supporting said plunger head in the conduit and means for reciprocating said plunger head to remove accumulated solid deposits formed at the mouth of the conduit.

2. An apparatus of the class described for removing solid products from the mouth of a conduit leading from a reaction chamber comprising a hemispherically shaped plunger mounted in said conduit, a sharp-edged peripheral flange projecting from the flat face of said plunger forming a cutting edge and means for operating said plunger to remove solid products from the mouth of the conduit.

3. An apparatus of the class described for removing solid reaction products from the vapor outlet conduit of a reaction chamber employed in the treatment of hydrocarbons comprising a hemispherically shaped plunger having vapor passages therethrough mounted in the conduit, fluid actuating means including a cylinder and piston for operating said plunger to remove solid deposits from the mouth of the conduit and a guide rod connected to said piston and projecting through the head of said cylinder for guiding said piston and indicating the position of said plunger in the conduit.

HOWARD DIMMIG.